(12) United States Patent
Gerhardt

(10) Patent No.: US 7,376,599 B1
(45) Date of Patent: May 20, 2008

(54) VIRTUAL WAREHOUSE PARTS DISTRIBUTION SYSTEM AND PROCESS

(75) Inventor: Brian L. Gerhardt, Mason, OH (US)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 09/523,079

(22) Filed: Mar. 10, 2000

Related U.S. Application Data

(60) Provisional application No. 60/178,779, filed on Jan. 28, 2000.

(51) Int. Cl.
*G06Q 30/00* (2006.01)
(52) U.S. Cl. ...................................................... 705/27
(58) Field of Classification Search .................. 705/26, 705/27, 37
See application file for complete search history.

(56) References Cited

U.S. PATENT DOCUMENTS

| | | | | |
|---|---|---|---|---|
| 4,799,156 | A * | 1/1989 | Shavit et al. .................. | 705/26 |
| 5,592,375 | A * | 1/1997 | Salmon et al. ................ | 705/22 |
| 5,694,551 | A * | 12/1997 | Doyle et al. ................... | 705/26 |
| 5,712,989 | A * | 1/1998 | Johnson et al. ............... | 705/28 |
| 5,758,328 | A * | 5/1998 | Giovannoli ................... | 705/26 |
| 5,845,265 | A * | 12/1998 | Woolston ...................... | 705/27 |
| 5,895,454 | A * | 4/1999 | Harrington ................... | 705/26 |
| 6,016,504 | A * | 1/2000 | Arnold et al. ................. | 705/27 |
| 6,023,683 | A * | 2/2000 | Johnson et al. ............... | 705/26 |
| 6,026,378 | A * | 2/2000 | Onozaki ....................... | 705/28 |
| 6,058,373 | A * | 5/2000 | Blinn et al. ................... | 705/26 |
| 6,324,522 | B2 * | 11/2001 | Peterson et al. .............. | 705/28 |
| 2002/0065764 | A1 * | 5/2002 | Brodersen et al. ............ | 705/37 |

OTHER PUBLICATIONS

Brodersen et al., U.S. Appl. No. 09/466,262, filed Dec. 17, 1999 (Unpublished application now publicly available based on claim for priority thereto by published U.S. Appl. No. 09/903,203—US2002/0065764).*

* cited by examiner

*Primary Examiner*—Gerald J. O'Connor
(74) *Attorney, Agent, or Firm*—William Scott Andes; Armstrong Teasdale LLP

(57) ABSTRACT

A parts distribution system and process uses a computer network, particularly the Internet, to efficiently distribute spare parts in a cost-effective manner. The system includes a plurality of buyer computers for operation by a system participant desiring to obtain one or more parts, a plurality of seller computers for operation by a system participant desiring to sell one or more parts, and at least one server computer. The buyer computers, seller computers and server computer are interconnected as a computer network. In operation, the seller computers are used to input part related data to the server computer, and the server computer uses the data to maintain a database of all available parts. The buyer computers are used to transmit part requests to the server computer, and the server computer selecting one or more parts from the database in response to the requests.

7 Claims, 2 Drawing Sheets

| | SELLER A | SELLER B | SELLER C | SELLER D | TOTALS |
|---|---|---|---|---|---|
| NEW | 8 | – | – | – | 8 |
| REPAIRED | – | 2 | 10 | – | 12 |
| SERVICEABLE | – | 4 | 2 | 6 | 12 |
| NEEDS REPAIR | – | 6 | – | 4 | 10 |

VIRTUAL WAREHOUSE PARTS DISTRIBUTION SYSTEM AND PROCESS

CROSS REFERENCE TO RELATED APPLICATION

This application claims the benefit of U.S. Provisional Application No. 60/178,779, filed Jan. 28, 2000.

BACKGROUND OF THE INVENTION

This invention relates generally to the distribution of spare parts and more particularly to a system and method of using a computer network such as the Internet to facilitate spare part distribution.

In many equipment-based industries, it is common to use service technicians to support and maintain the equipment. Such support and maintenance often requires a large number of spare parts. However, one problem with servicing such equipment has been obtaining the necessary spare parts in an efficient and cost-effective manner.

An exemplary industry where this problem occurs is commercial aviation. Aircraft are routinely subject to various maintenance operations as part of their normal operation. Aircraft engines in particular have many components that periodically need to be replaced, on a scheduled or unscheduled basis. As is the case for many types of equipment, spare parts for aircraft engines are available from a wide variety of sources. For example, newly manufactured parts can be obtained from vendors or original equipment manufacturers (OEMs) that produce the parts. Used parts can be obtained from overhaul and repair shops or engine operators such as airlines. In addition, site excess (i.e., unused parts previously obtained by a repair site or engine operator but no longer needed by that entity) and site rotables (i.e., used or unused parts kept on hand by service shops to be used in place of a customer's parts while those parts are being repaired) are often available.

While such numerous and diverse options for obtaining spare parts are available, the various sources form an unorganized network of prospective sellers that are generally independent from one another. Thus, a prospective buyer is faced with a daunting task when trying to obtain acceptable parts at the lowest price available. Currently, when an operation such as an engine service shop or an engine operator has a need for spare parts, the prospective buyer must search the unorganized network of prospective sellers on a source-by-source basis by contacting individual sources and inquiring whether they have the desired parts available and, if so, at what pricing. Given the large number of sources available, it is generally not practical to obtain a quote from every possible source. Many operations require that some minimum number of quotes (such as three) be obtained prior to issuing a purchase order to provide some comfort level that a reasonable price will be obtained. However, this is a subjective approach in that it relies heavily on guesswork as to which sources should be contacted. Furthermore, even when limiting the number of quotes required to be obtained, this approach can be a time consuming and inefficient process that does not guarantee the lowest pricing.

Accordingly, there is a need for an easy and effective spare parts distribution system and process that enables prospective buyers to obtained desired parts at the best price possible or in accordance with other preferences.

BRIEF SUMMARY OF THE INVENTION

The above-mentioned need is met by the present invention which provides a network-based parts distribution system and process. The system includes a plurality of buyer computers for operation by a system participant desiring to obtain one or more parts, a plurality of seller computers for operation by a system participant desiring to sell one or more parts, and at least one server computer. The buyer computers, seller computers and server computer are interconnected as a computer network. In operation, the seller computers are used to input part related data to the server computer, and the server computer uses the data to maintain a database of all available parts. The buyer computers are used to transmit part requests to the server computer, and the server computer selecting one or more parts from the database in response to the requests.

The present invention and its advantages over the prior art will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
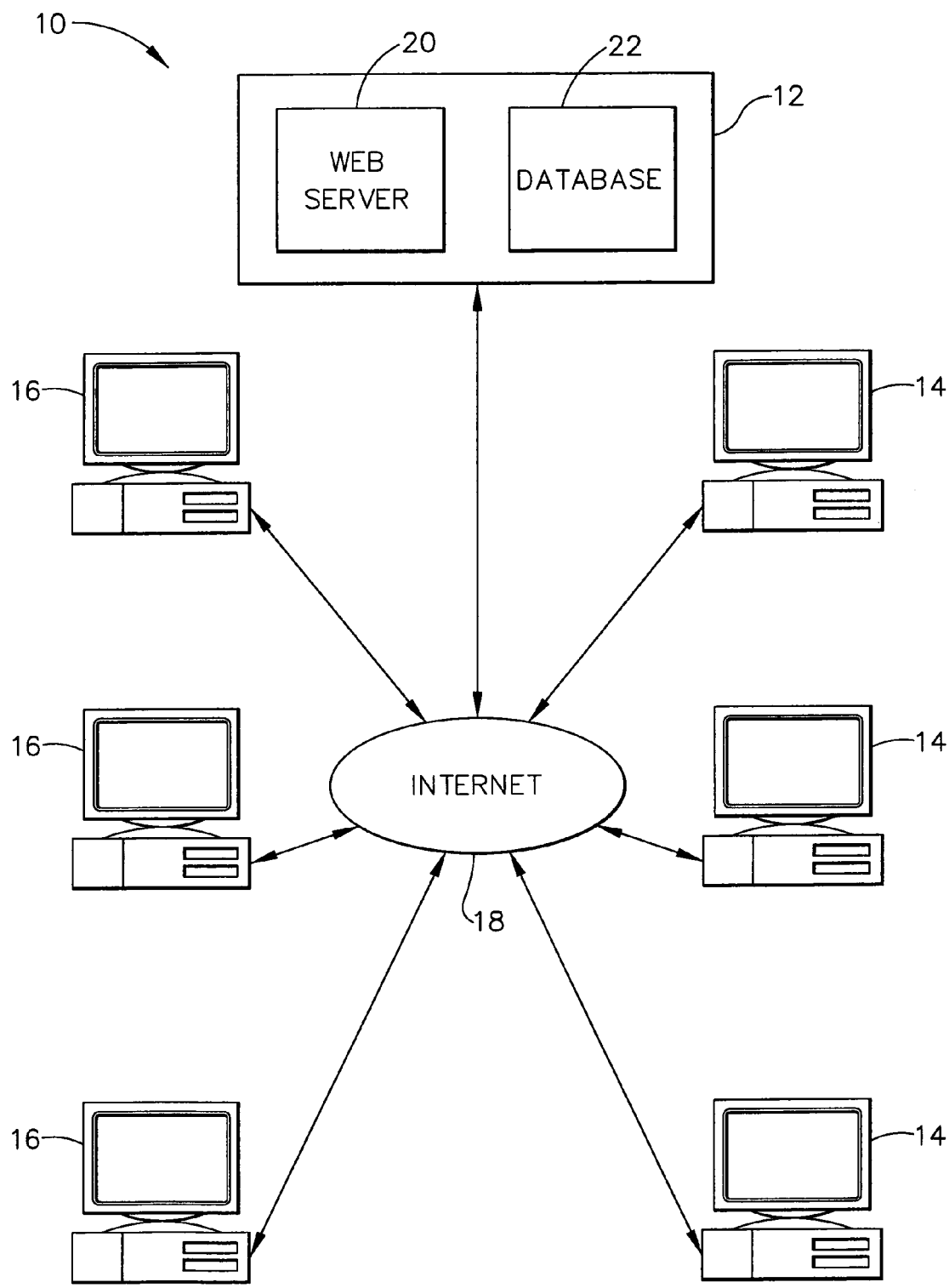
FIG. 1 is a schematic view of a virtual warehouse parts distribution system.

Referring to the drawings wherein identical reference numerals denote the same elements throughout the various views, FIG. 1 shows a virtual warehouse parts distribution system 10. The system 10 includes at least one central server computer 12, a plurality of buyer computers 14 operated by system participants interested in obtaining parts (referred to herein as buyers), and a plurality of seller computers 16 operated by system participants wishing to sell parts (referred to herein as sellers). It should be noted that a system participant could participate as both a buyer and a seller. For example, many organizations concerned with aircraft engine repair, such as overhaul shops and engine operators, can experience both excesses and shortages of various parts. Such an organization would be interested in participating in the system 10 to sell excess parts and buy parts that are in short supply. This would also be the case in many fields other than aircraft engine repair. Accordingly, although the buyer computers 14 and the seller computers 16 as shown in FIG. 1 as being distinct components of the system 10 for the purposes of illustration, it should be understood that a single computer could be configured to function as both a buyer computer 14 and a seller computer 16.

The server computer 12, the buyer computers 14 and the seller computers 16 are all interconnected via a computer network 18 and can thus be geographically dispersed on a regional, national or worldwide basis. The network 18 is preferably the Internet, although it is possible to employ other types of computer networks such as a local area network or a wide area network. In general, the buyer computers 14 and the seller computers 16, which may be conventional workstations, personal computers, or the like, are client computers that include a conventional Web browser software application. The browser allows the computer 14,16 to access Hypertext Markup Language (HTML) Web pages and other data stored on the server computer 12 or any other server systems connected to the network 18. Note that the present invention is not limited to the use of HTML; other suitable languages may be substituted within the scope of the present invention. As is known in the art, the system 10 may also include firewall protection (not shown) to prevent non-system participants from gaining access thereto.

The server computer 12, which could comprise a cluster of server computers, includes a Web server 20 (i.e., a computer program that serves requested HTML pages or files) for communicating with the buyer computers 14 and the seller computers 16, and a parts inventory database 22. The database 22 contains a list of all the parts that the various sellers participating in the system 10 are willing to sell, and thus represents a pool of all the parts available for purchase via the system 10. The server computer 12 is programmed to receive data relating to the available parts and uses the data to maintain the database 22. The server computer 12 is also programmed to receive requests for parts from prospective buyers and subsequently search the database 22 for such parts.

Generally, the operation of the system 10 comprises two primary processes: a database creation and maintenance process and a part selection process. In the database creation and maintenance process, prospective sellers willing to sell one or more parts utilize the seller computers 16 to upload data corresponding to the parts to the server computer 12. The server computer 12 processes the data and adds the parts to the database 22 in a sorted fashion. The database 22 is continually updated in this fashion as newly available parts are posted by the various sellers. When a part is selected by a buyer in the manner described below, it is immediately removed from the database 22, thereby prohibiting other buyers from subsequently selecting parts that have already been purchased. Thus, the database 22 is constantly changing as parts are posted and sold so as to represent an accurate pool of available parts.

The data uploaded by the buyer computers 14 to the server computer 12 must describe the corresponding parts with sufficient detail to enable the system 10 to make appropriate part selections in accordance with the buyers' requests. The actual data needed will vary depending on the nature of the parts contained in the system 10. In most all applications, the minimum data requirements will generally include part numbers, serial numbers, quantity and pricing. Other data could be useful for some types of parts. By way of example, if the virtual warehouse parts distribution system 10 contained an inventory database of aircraft engine parts it would be useful to include data identifying the source of each part as well as each part's condition, namely whether it is new or used. Related information such as a part's time since new and/or cycles since new would also be helpful. As mentioned above, spare parts for aircraft engines, both new and used, are available from a wide variety of diverse sources. It should be emphasized that aircraft engine parts are only being used as an example to facilitate description of the present invention and that the present invention is in no way limited to this type of parts.

Figures 2, 3:
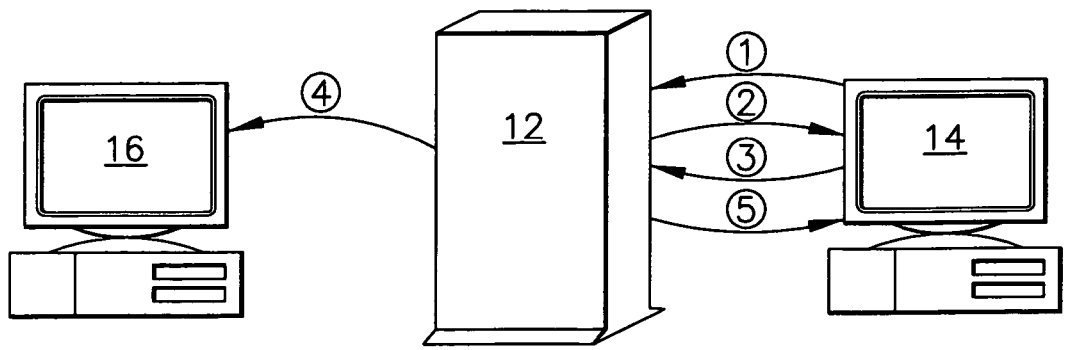
FIG. 2 graphically illustrates a matrix representing one inventory category from the database of the virtual warehouse parts distribution system.
FIG. 3 graphically illustrates a parts selection process of the present invention.

The inputted data is used to sort the parts in a manner that will facilitate the searching of the database 22 for appropriate parts to meet buyer requests. For example, the database 22 can be divided into a number of inventory categories that contain a particular type of part. These inventory categories could be limited to a single part number or a part number and its alternative part numbers. As can be seen in FIG. 2, each inventory category can be further divided into sub-inventory categories. As shown, the inventory category is sorted as a matrix whereby the available parts are broken down by condition and seller and each box in the matrix represents a sub-inventory category. The first row of the matrix corresponds to new parts and the remaining rows correspond to used parts, wherein the used parts are further sorted as being repaired parts, serviceable parts (i.e., parts suitable for use as is), and parts needing repair. Each column in FIG. 2 corresponds to the source or seller that is offering the part. Although only four columns are depicted in the Figure, the number of columns will actually match the number of sellers participating in the system 10. Thus, the numbers of new parts, repaired parts, serviceable parts and repairable parts available from each seller can be determined. In the inventory category depicted in FIG. 2, for example, Seller A has 8 new parts available and Seller B has 4 serviceable parts available.

It is again pointed out that a single system participant could be both a seller and a buyer. That is, a repair shop may have a surplus of one part that they wish to sell and also have a need to obtain other parts. In this case, one of the columns would represent the system participant's own available inventory. Accordingly, such a system participant would be able to use the system 10 to monitor its own inventory as well as the entire database 22.

The system 10 can also be programmed to include a "kanban function." Kanban is a well known technique used in manufacturing operations practicing just-in-time methods. Briefly, if a manufacturing workstation needs a part, it sends a signal, such as a colored card, to the station that makes the part to send more of the parts. In accordance with just-in-time philosophy, limits are put on how many parts are sent so that an excess of the part will not occur. In the present invention, maximum and minimum kanban limits are programmed into the server computer 12 for each sub-inventory category. Then, if a particular sub-inventory category is at its maximum value, no more of that particular part will be accepted. If the sub-inventory category falls below its minimum value, then the seller is notified that more such parts are needed.

Referring now to FIG. 3, the part selection process is illustrated. In Step 1, a prospective buyer wishing to obtain specific parts utilizes a buyer computer 14 to access the server computer 12. Specifically, the buyer computer 14 sends a request for the desired parts to the server computer 12. Generally, the request will identify the desired parts by part number and quantity. In response, the server computer 12 performs an automated search of the inventory database 22 to determine if the desired parts are available and selects the most suitable parts from the pool of available parts found in the search, if any are found.

The server computer 12 is programmed to make the selection of parts for a buyer based on that buyer's specified picking order. In other words, the buyer may have certain preferences relating to what parts will be accepted. For example, a buyer may want all used parts (which are generally less expensive than newly manufactured parts), or a buyer may want all used parts except for certain part numbers. Another example could be that a buyer might be generally willing to accept used parts, but not from particular sources. The process will take all of these preferences into account for each participant and develop a hierarchy of preferences to establish a buyer-specific picking order. This picking order is programmed into the system 10 so that the server computer 12 will automatically use the picking order when searching the database 22 in response to a buyer request.

In Step 2, then the server computer 12 sends a message to the buyer computer 14 informing it of the availability of the desired parts. If the parts are not available, then the selection process ends at this point. If desired parts are available, then server computer's message notifies the buyer computer of the availability of the selected parts and includes an instruction to the buyer computer 14 to issue a purchase order identifying the parts desired, the needed quantity and the delivery location to the appropriate seller. In Step 3, the buyer computer 14 issues the purchase order, preferably via electronic data interchange (EDI) or a similar electronic uplink means, to the server computer 12, and the server computer 12 relays the purchase order to the appropriate seller computer 16 at Step 4. Note that in some instances it is possible that not all of the parts needed to fulfill a given buyer's request are supplied by the same seller. In that case, multiple purchase orders would be issued, with one purchase order going to each seller for the parts provided by that seller.

When the purchase order is received at the seller computer 16, the seller ships the parts directly to the buyer. Typically, the seller will provide an invoice either with the shipment or on its regular billing cycle. Upon receipt of the parts, the buyer routes the parts to the shop floor, where a determination is made whether the parts will be used. If any of the parts are not used, then these parts are returned to the buyer's inventory. At this point, the buyer, at Step 5, could upload data corresponding to these parts to the server computer 12 for posting in the database 22, thereby utilizing the system 10 as a seller.

In order to ensure consistent and equitable operation of the system 10 among the multiple participants, it is preferred that a master agreement that controls participation in the system 10 be utilized. All system participants would be required to sign the master agreement to join the system 10. All aspects of the transactions between buyers and sellers under the system 10, including the terms of the blanket purchase orders, would thus be determined before participation in the system 10 commenced. The master agreement could also provide for an auditing function wherein the data describing the parts posted by prospective sellers would periodically be checked for accuracy.

The foregoing has described a network-based, automated system and process for efficiently obtaining spare parts in a cost-effective manner. The system coordinates multiple participants and can be integrated into site legacy systems. While specific embodiments of the present invention have been described, it will be apparent to those skilled in the art that various modifications thereto can be made without departing from the spirit and scope of the invention as defined in the appended claims.

What is claimed is:

1. A network-based parts distribution system comprising:
   a plurality of buyer computers for operation by at least one of a plurality of system participants desiring to obtain one or more parts;
   a plurality of seller computers for operation by at least one of a plurality of system participants desiring to sell one or more parts;
   at least one server computer, wherein said buyer computers, said seller computers and said server computer are interconnected as a computer network, said server computer being programmed to receive part related data from said seller computers and use said data to maintain a database of all available parts and to receive part requests from said buyer computers, said at least one server computer is programmed to determine whether a part requested from a requesting computer of said buyer computers is available within said database,
      if said requested part is available, said server computer is programmed to select one or more parts from said database in response to said part request and send a message to said requesting buyer computer,
      if said requested part is unavailable, said server computer is programmed to end a selection process, wherein said parts in said database are sorted into a plurality of inventory categories, and wherein said parts in at least one of said inventory categories are further sorted into a plurality of sub-inventory categories based upon part condition;
   a master agreement that each of said system participants is required to sign to initiate their participation in the system, said master agreement controlling participation in the system and regulating terms of transactions made within the system; and
   said server computer configured to relay a purchase order consistent with said transaction aspects determined by said master agreement wherein each of said system participants is able to buy and sell parts.

2. The parts distribution system of claim 1 wherein said server computer selects parts according to a buyer-specific picking order.

3. The parts distribution system of claim 1 wherein said computer network is the Internet.

4. A method of distributing parts, said method comprising the steps of:
   obtaining an agreement signed by each system participant of a plurality of system participants before participation of each of said system participants in the system is initiated, to join in a network-based, automated virtual warehouse parts distribution system, said agreements controlling participation in the system and regulating terms of transactions made within the system, each system participant of a plurality of system participants is able to buy and sell parts;
   providing a plurality of buyer computers for operation by a system participant desiring to obtain one or more parts;
   providing a plurality of seller computers for operation by a system participant desiring to sell one or more parts;
   providing at least one server computer, wherein said buyer computers, said seller computers and said server computer are interconnected as a computer network;
   using said seller computers to input part related data to said server computer;
   using said data to maintain a database of all available parts, said step of maintaining said database including sorting said parts in said database into a plurality of inventory categories, wherein said parts in at least one of said inventory categories are further sorted into a plurality of sub-inventory categories based upon part condition;

using said buyer computers to transmit part requests to said server computer; and using said server computer to determine whether a part requested from a requesting computer of said buyer computers is available within said database, if said requested part is available, said server selecting one or more parts from said database in response to said part request and sending a message to said requesting buyer computer, if said requested part is unavailable, said server ending a selection process.

5. The method of claim 4 wherein said step of selecting one or more parts from said database includes selecting parts according to a buyer-specific picking order.

6. The method of claim 4 further comprising the step of using said server computer to relay a purchase order consistent with the agreement and issued by one of said buyer computers to an appropriate one of said seller computers.

7. The method of claim 4 wherein said computer network is the Internet.

* * * * *